(12) United States Patent
Roesgen

(10) Patent No.: US 9,993,756 B2
(45) Date of Patent: Jun. 12, 2018

(54) FILTER WITH BARB-SHAPED BAYONET RECEPTACLE AND FILTER ELEMENT

(71) Applicant: Mann+Hummel GMBH, Ludwigsburg (DE)

(72) Inventor: André Roesgen, Remshalden (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 182 days.

(21) Appl. No.: 14/860,856

(22) Filed: Sep. 22, 2015

(65) Prior Publication Data
US 2016/0082373 A1 Mar. 24, 2016

(30) Foreign Application Priority Data

Sep. 22, 2014 (DE) .......................... 10 2014 013 758

(51) Int. Cl.
*B01D 35/30* (2006.01)

(52) U.S. Cl.
CPC ........... *B01D 35/306* (2013.01); *B01D 35/30* (2013.01); *B01D 2201/302* (2013.01); *B01D 2201/4015* (2013.01)

(58) Field of Classification Search
None
See application file for complete search history.

(56) References Cited

U.S. PATENT DOCUMENTS

| 5,045,192 | A | * | 9/1991 | Terhune | ................. | B01D 29/15 |
| | | | | | | 210/232 |
| 5,645,718 | A | * | 7/1997 | Hardison | ........... | B01D 17/0211 |
| | | | | | | 210/232 |
| 6,251,273 | B1 | | 6/2001 | Jawurek et al. | | |
| 8,202,419 | B2 | | 6/2012 | Wallerstorfer | | |
| 9,724,629 | B2 | * | 8/2017 | Lane | .......................... | A45F 3/18 |
| 2011/0147297 | A1 | | 6/2011 | Core | | |
| 2013/0075319 | A1 | * | 3/2013 | Roesgen | ................ | B01D 29/21 |
| | | | | | | 210/232 |

FOREIGN PATENT DOCUMENTS

| DE | 102010035465 A1 | 2/2012 |
| WO | WO 2011/144582 | * 11/2011 |

* cited by examiner

*Primary Examiner* — Benjamin M Kurtz
(74) *Attorney, Agent, or Firm* — James Hasselbeck

(57) ABSTRACT

The invention relates to a filter (10) having at least a first bayonet joint (22). The first bayonet joint (22) has a first bayonet slotted guide (26) with two locking positions that are axially spaced apart from one another for a first bayonet projection (24) of the first bayonet joint (22). By rotating a filter part for releasing the first bayonet joint (22), the first bayonet projection (24) may be moved from the second locking position into the first locking position. The filter (10) preferably has a second bayonet joint (28). The second bayonet joint (28) is preferably embodied such that, by further rotation in the same direction of rotation, it is released in that a second bayonet projection (30) is moved out of a third locking position of a second bayonet slotted guide (32) of the second bayonet joint (28) after the first bayonet projection (24) has been stopped in the first locking position. The second locking position is preferably embodied axially offset from the first locking position such that when the first bayonet projection (24) is moved from the second locking position into the first locking position, there is an increase in the volume of the filter (10) in which medium of the filter (10) may be received.

6 Claims, 3 Drawing Sheets

FILTER WITH BARB-SHAPED BAYONET RECEPTACLE AND FILTER ELEMENT

TECHNICAL FIELD

The invention relates to a filter having a first bayonet joint, wherein the first bayonet joint has a first bayonet projection and a first bayonet slotted guide for guiding the first bayonet projection and relates to a filter element for such a filter.

BACKGROUND OF THE INVENTION

Connecting filter parts using a bayonet joint in a reversibly detachable manner is known. The bayonet joint permits simple, tool-free exchange of the filter parts.

Installing a filter element for a water filter using a bayonet joint has become known from DE 10 2007 038 018 A1. Using the "lock-and-key principle," the bayonet joint prevents the wrong filter element from being installed.

DE 10 2010 035 465 A1 discloses a filter having a filter head and a filter bowl. The filter bowl may be attached to the filter head by means of a bayonet joint. The bayonet joint has a locking shoulder that is embodied for holding the filter bowl in a final position.

A filter having a filter element and a filter bowl has become known from US 2011/0147297 A1. The filter element may be placed into the filter bowl. Filter element and filter bowl have bayonet projections that complete one another. The mutually completed bayonet projections connect the filter element in the filter bowl to a filter head for the filter.

Furthermore DE 197 07 132 A1 discloses a filter having a filter element and a filter housing. The filter element can be locked in the filter housing. The locking connection has a locking recess with various locking areas.

Finally, an oil filter became known from WO 2011/144582 A1. The oil filter includes a bayonet joint having a bayonet slotted guide and a bayonet projection. The bayonet projection may be guided in the bayonet slotted guide successively in a first insertion direction, in a first transverse direction that runs transverse to the insertion direction, and in a second transverse direction that is both transverse to the insertion direction and is also transverse to the first transverse direction, to a first locking position in the form of a locking area.

With the known filters, medium may escape when filter parts are exchanged.

SUMMARY OF THE INVENTION

The underlying object of the invention is therefore to create a compact and stable filter having at least one exchangeable filter part, wherein medium is reliably prevented from escaping from the filter when filter parts are exchanged.

The inventive object is thus attained using a filter having a first bayonet joint for connecting a filter bowl of the filter to a filter element of the filter that has a filter medium, wherein the first bayonet joint has a first bayonet projection and a first bayonet slotted guide for guiding the first bayonet projection, wherein the first bayonet projection may be guided overall in a barb shape successively in the following directions in the first bayonet slotted guide:
a) In a first insertion direction;
b) In a first transverse direction that runs transverse to the first insertion direction to a first locking position;
c) In a second transverse direction that runs transverse to the first insertion direction and transverse to the first transverse direction;
d) In a third transverse direction that runs transverse to the second transverse direction to a second locking position.

Using the essentially barb-shaped guide segment of the bayonet projection, the volume of the filter is effectively increased when the first bayonet joint between the two locking positions is released before the filter parts connected to the first bayonet joint are completely disengaged. Excess medium is received in the effectively increased volume of the filter so that the medium is prevented from escaping.

When the filter is in operating status, the filter is preferably vertically oriented along its center longitudinal axis. The second locking point is preferably embodied vertically offset from the first locking point and the first locking point is embodied vertically offset from an insertion opening of the first bayonet slotted guide.

Furthermore, the first bayonet slotted guide preferably has only a single insertion opening for the first bayonet projection.

In another preferred embodiment of the invention, the first insertion direction runs parallel to the filter center longitudinal axis. This simplifies assembly of the first bayonet joint.

To attain a very reliable and compactly embodied bayonet joint, the third transverse direction may run parallel or antiparallel to the first transverse direction.

The axis of rotation of the first bayonet joint preferably coincides with the filter center longitudinal axis. This facilitates being able to embody the filter in a particularly simple manner structurally.

The filter element may have the first bayonet projection and the filter bowl may have the first bayonet slotted guide or the filter bowl may have the first bayonet projection and the filter element may have the first bayonet slotted guide. The filter bowl is preferably embodied for receiving medium when the first bayonet joint between filter element and filter bowl is opened.

The filter element may be embodied in the form of a water-separating filter element, wherein the filter bowl has a water collection chamber for water separated in the filter element. The filter element is especially preferred in the form of a water-separating fuel filter, especially in the form of a pre-filter.

The filter preferably has a second connecting device. The second connecting device is embodied for connecting the filter element to a filter head of the filter, wherein the filter head has a medium line that is fluidically connected to the filter element. The filter head may have a medium supply line and/or a medium discharge line for medium to be filtered or for filtered medium. The filter head may be securely connected to an internal combustion engine of a motor vehicle.

The second connecting device is preferably adjusted with respect to the first bayonet joint such that rotating the first bayonet joint to release the latter also releases the second connecting device. The second locking position permits the first bayonet projection to be held in the second locking position, so that further rotating the first bayonet joint releases the second connecting device. The filter element housing transmits the torque from the first bayonet joint to the second connecting device. Thus no additional tool is required for releasing the second connecting device or for releasing the filter element from the filter head.

The first bayonet joint and the second connecting device preferably have the same axis of rotation.

For producing a screw connection, the second connecting device may have first and second threaded segments on the filter head and filter element.

Alternatively, the second connecting device may be embodied as a second bayonet joint, wherein the second bayonet joint has a second bayonet projection and a second bayonet slotted guide for guiding the second bayonet projection.

It is particularly preferred that the second bayonet projection may be guided overall in a curve successively in the following directions in the second bayonet slotted guide:
   a) In a second insertion direction;
   b) In a fourth transverse direction that runs transverse to the second insertion direction;
   c) In a fifth transverse direction that runs transverse to the fourth transverse direction to a third locking position.

The second insertion direction may run parallel to the filter center longitudinal axis. This simplifies the assembly of the second bayonet joint.

The second bayonet projection may have two adjacent support surfaces, corresponding to the first bayonet projection, with which it is positioned in an operating position against corresponding countersupport surfaces of the second bayonet slotted guide and via which it is held in operation.

In one alternative embodiment that is particularly advantageous when there are large forces, the second bayonet projection has two opposing support surfaces that in an operating position are positioned against corresponding countersupport surfaces of the second bayonet slotted guide so that the second bayonet projection is clamped therebetween. The two support surfaces preferably do not run parallel to one another, but instead form an acute angle. The second bayonet slotted guide tapers correspondingly in a direction corresponding to the fifth transverse direction.

To adjust the second bayonet joint to the first bayonet joint, the fourth transverse direction preferably runs antiparallel to the second transverse direction.

BRIEF DESCRIPTION OF THE DRAWINGS

Additional features and advantages of the invention result from the following detailed description of one exemplary embodiment of the invention, using the figures in the drawings, which depict details that are essential to the invention, and from the claims.

The features depicted in the drawings are depicted such that the inventive special features may be rendered clearly evident. The various features may each be realized individually by themselves or in a plurality in desired combinations for variants of the invention.

FIG. 1 depicts a filter 10 having a filter head 12, a filter element 14, and a filter bowl 16. The filter 10 is embodied in the form of a fuel filter, especially in the form of a water-separating fuel filter.

Figure 1:
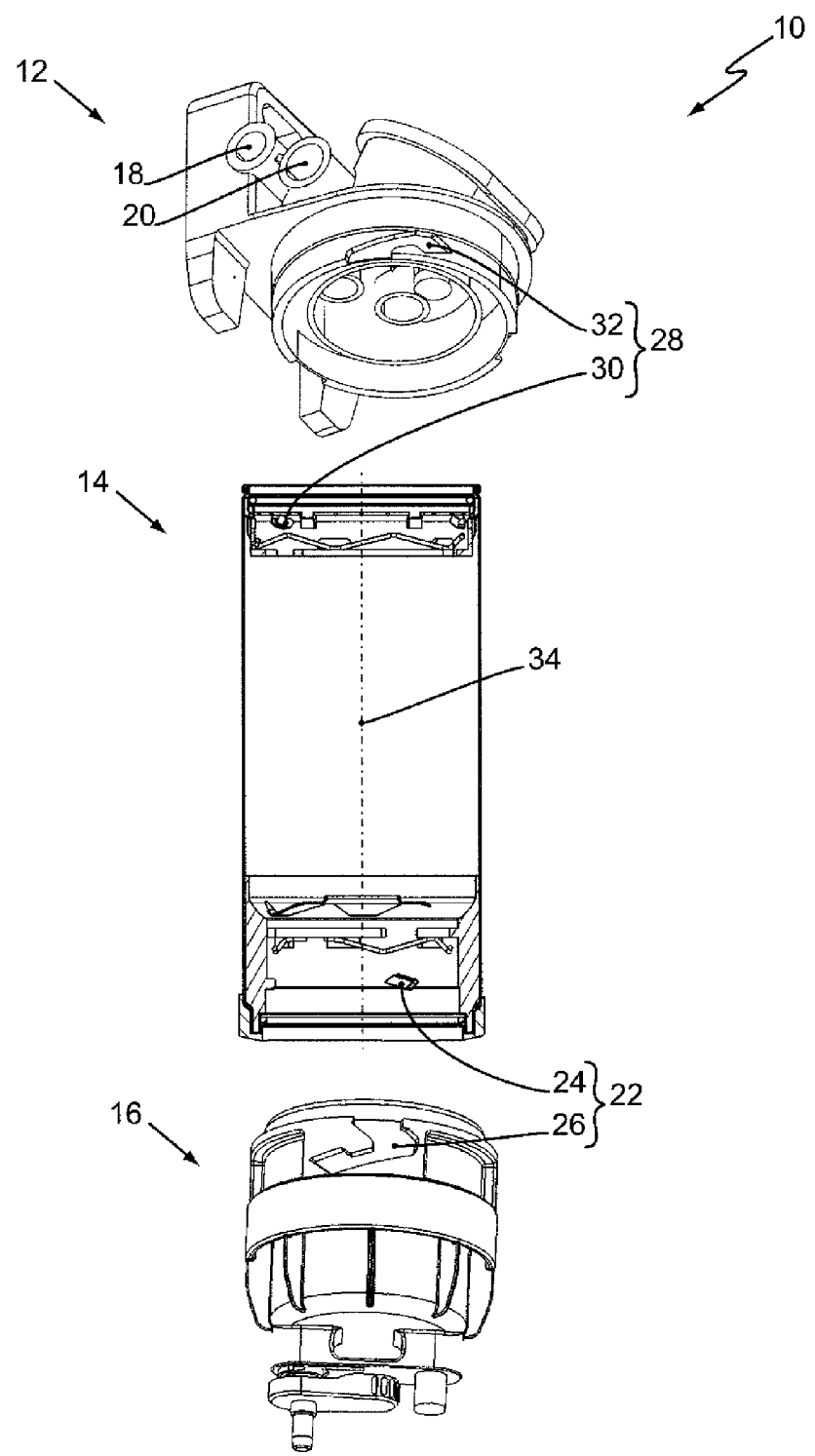
FIG. 1 depicts an inventive filter having a filter head (in a perspective elevation), a filter element (shown in section), and a filter bowl (in a perspective elevation)

The filter head 12 is securely connected to an internal combustion engine of a motor vehicle (not shown). The filter head has a medium supply line 18 for medium to be filtered, especially for fuel, and a medium discharge line 20 for filtered medium, especially for filtered fuel. The medium supplied and discharged via the filter head 12 is cleaned in the filter element 14. To this end, the filter element 14 has a filter medium (not shown) for filtering out particles and has a water separator (not shown). The water separated in the filter element 14 is collected in the filter bowl 16.

The filter element 14 can be connected to the filter bowl 16 via a first bayonet joint 22. The first bayonet joint 22 has a first bayonet projection 24 and a first bayonet slotted guide 26. The first bayonet projection 24 may be guided in the first bayonet slotted guide 26.

A second bayonet joint 28 is provided for connecting the filter head 12 to the filter element 14. The second bayonet joint 28 has a second bayonet projection 30 on the filter element 14 and a second bayonet slotted guide 32 on the filter head 12. The second bayonet projection 30 may be guided in the second bayonet slotted guide 32.

For exchanging the filter element 14, the bayonet joints 22, 28 are released and are re-established after a new filter has been inserted. The bayonet joints 22, 28 are opened and closed by rotating the filter bowl 16 about the filter center longitudinal axis 34.

Figure 2:
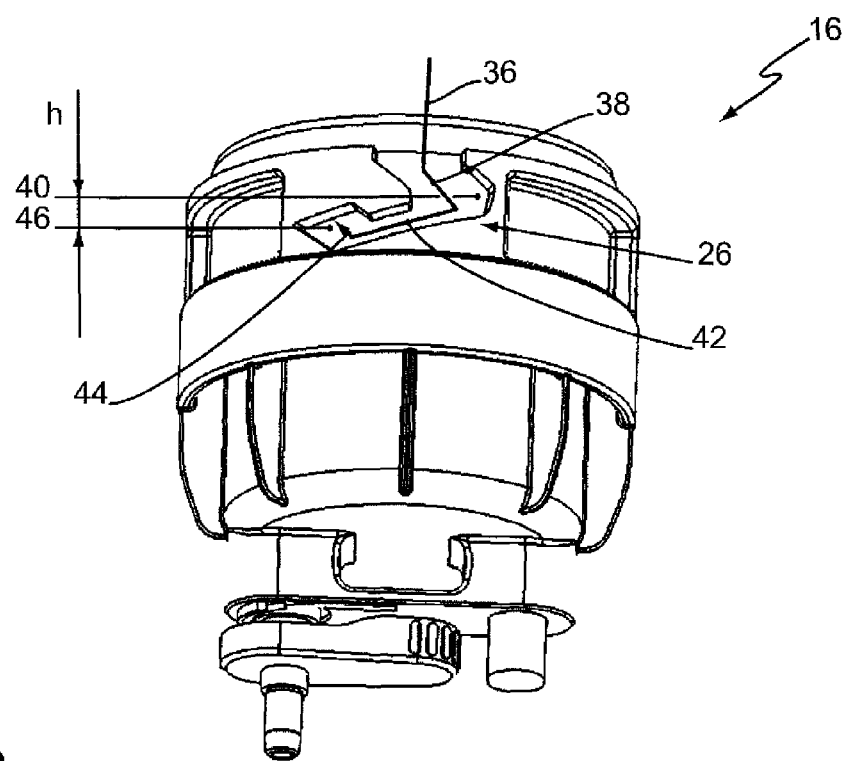
FIG. 2 is an enlarged view of the filter bowl from FIG. 1.

FIG. 2 depicts an enlarged view of the filter bowl 16. It may be seen from FIG. 2 that the first bayonet projection 24 (see FIG. 1) may be inserted in a first insertion direction 36 into the first bayonet slotted guide 26. The first insertion direction 36 runs parallel to the center filter longitudinal axis 34 (see FIG. 1). The first bayonet projection 24 (see FIG. 1) may be guided in the first bayonet slotted guide 26 in a first transverse direction 38 that runs transverse to the first insertion direction 36. The first bayonet projection 24 (see FIG. 1) may be guided in the first transverse direction 38 to a first locking position 40. Then the first bayonet projection 24 (see FIG. 1) may be guided in a second transverse direction 42 that runs transverse to the first insertion direction 36 and also runs transverse to the first transverse direction 38. Finally, the first bayonet projection 24 (see FIG. 1) may be guided in a third transverse direction 44 to a second locking position 46. The first bayonet slotted guide 26 is thus essentially embodied in a barb shape.

Figure 3:
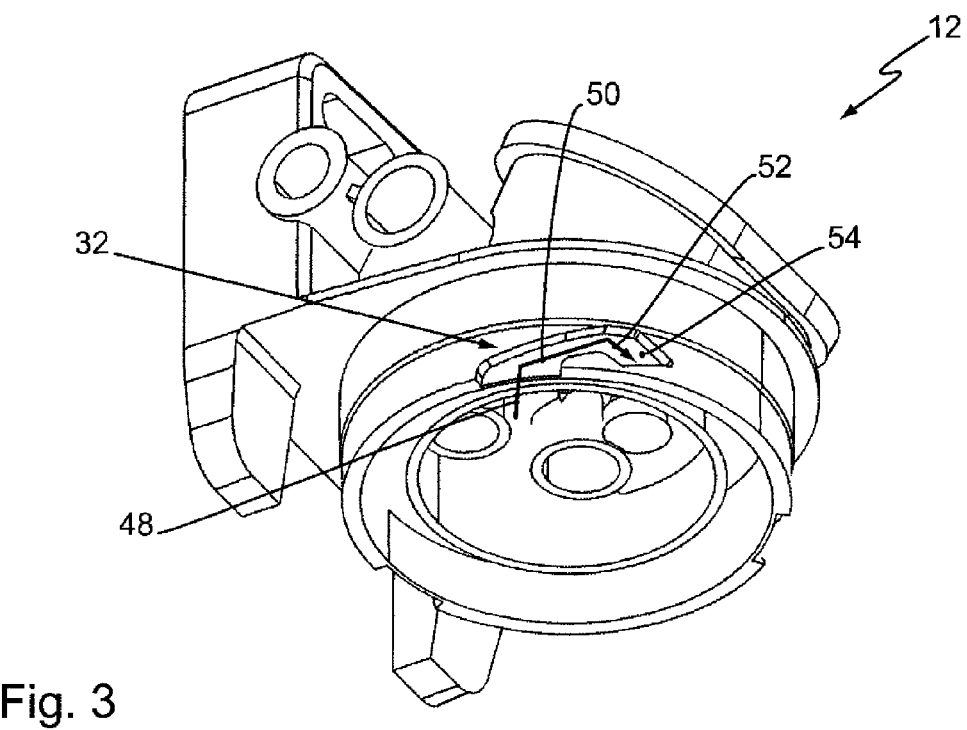
FIG. 3 is an enlarged view of the filter head from FIG. 1.

FIG. 3 depicts an enlarged view of the filter head 12. It may be seen from FIG. 3 that the second bayonet projection 30 (see FIG. 1) may be inserted into the second bayonet slotted guide 32 in a second insertion direction 48. The second insertion direction 48 runs parallel to the filter center longitudinal axis 34 (see FIG. 1). Then the second bayonet projection 30 (see FIG. 1) may be guided in the second bayonet slotted guide 32 in a fourth transverse direction 50, that runs transverse to the second insertion direction 48. After this, the second bayonet projection 30 (see FIG. 1) may be guided in a fifth transverse direction 52 to a third locking position 54 that runs transverse to the second insertion direction 48 and also runs transverse to the fourth transverse direction 50. The second bayonet slotted guide 32 is thus essentially embodied in a curve.

The following describes how the filter element 14 of the filter 10 is disassembled, with reference to all three FIGS. 1, 2, and 3:

When the first bayonet projection 24 is in the second locking position 46, the filter bowl 16 is completely assembled and locked on the filter element 14. To release the first bayonet joint 22, the filter bowl 16 is rotated about the filter longitudinal axis 34 until the first bayonet projection 24 is disposed at the first locking position 40. Another rotation of the filter bowl 16 causes a rotation of the filter element 14 due to the bayonet projection 24 stopping in the first locking position 40. Because of this, the second bayonet projection 30 is rotated out of the second bayonet slotted guide 32 so that the filter element 14 is released from the filter head 12, while the filter element 14 remains on the filter bowl 16. The filter bowl 16 may then be separated from the filter element 14 by rotation in the opposing direction, wherein the first bayonet projection 24 is moved in opposition to the first transverse direction 38 and then is moved in opposition to the first insertion direction 36.

When the first bayonet projection 24 is moved from the second locking position 46 into the first locking position 40, the filter bowl 16 is moved away from the filter element 14 relative to the filter element 14. This creates an additional volume between the filter element 14 and the filter bowl 16, since the locking positions 40, 46 are embodied spaced axially from one another, i.e. parallel to the filter center longitudinal axis 34, by the height h. Medium from the filter element 14 is received in the additional volume so that medium is effectively prevented from escaping when the filter element 14 is exchanged.

In an advantage embodiment for the second bayonet joint 28 the locking projection 30 has two opposing support surfaces that are arranged at an angle to one another. The support surfaces form an acute angle, for instance between 10 and 50 degrees. The corresponding countersupport surfaces of the second bayonet slotted guide 32 also run at an angle to one another, so that the cross-section tapers in the fifth transverse direction, which corresponds to the locking direction for the second bayonet joint. This means that during operation the support surfaces are always positioned against the corresponding countersupport surfaces. The locking projection 30 may be made of the same hard plastic as the rest of the filter element 14, or more precisely its housing. Advantageously, the locking projection is embodied with one or more segments made of a material having a lower hardness, especially a resilient plastic, for instance PA12 Vistamid. The softer plastic may be directly molded onto the harder plastic. The at least one segment made of the softer plastic forms at least one of the support surfaces. Also in this embodiment the filter element 14, especially the housing of the filter element 14, transmits the force of the first bayonet joint 22 on the lower end region of the filter element 14 to the second bayonet joint 28 on the upper end region so that when the first bayonet joint 22 is released, further rotation of the housing bowl 16 after positioning of the first bayonet projection 24 in the first locking position 40 releases the second bayonet joint 28 between filter element 14 and filter head 12.

Figure 4:
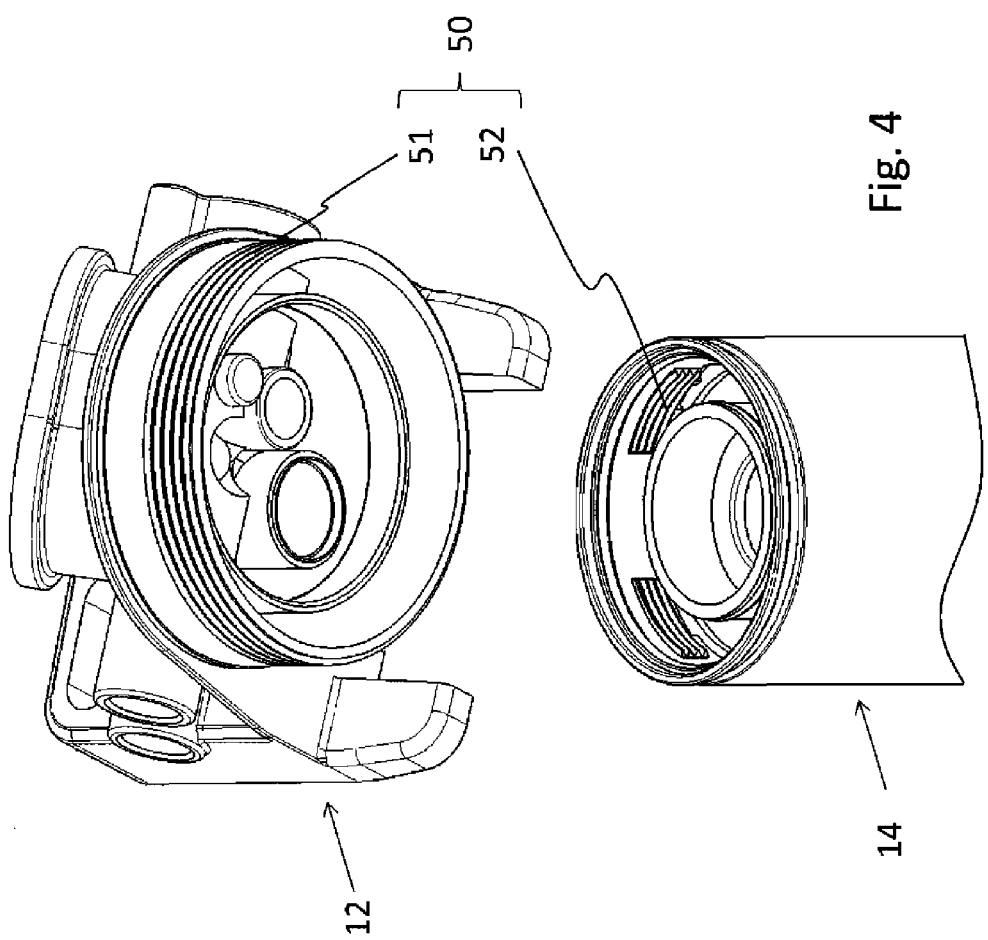
FIG. 4 depicts a filter bowl and a filter element having a second connecting device embodied as a screw connection.

FIG. 4 depicts a filter head having a first threaded segment 51 of a screw connection and a filter element 14 having a second threaded segment 52. The second threaded segment 52 may comprise separate threaded regions as depicted, or it may be embodied as a continuous thread. The lower end of the filter element 14 and the filter bowl 12 having the first bayonet joint 22 are not depicted but are embodied as in FIG. 1. The filter element 14, especially the housing of the filter element 14, transmits the force of the first bayonet joint 22 to the threaded connection 50 so that when the first bayonet joint 22 is released, further rotation of the housing bowl 16 after positioning of the first bayonet projection 24 in the first locking position 40 releases the threaded connection 50 between filter element 14 and filter head 12.

In summary, the invention relates to a filter having at least a first bayonet joint. The first bayonet joint has a first bayonet slotted guide with two locking positions that are axially spaced apart from one another for a first bayonet projection of the first bayonet joint. By rotating a filter part for releasing the first bayonet joint, the first bayonet projection may be moved from the second locking position into the first locking position. The filter preferably has a second connecting device, for instance a second bayonet joint or a threaded connection. The second connecting device is preferably embodied such that it is released by further rotation in the same direction of rotation. When there is a second bayonet joint, a second bayonet projection moves out of a third locking position of a second bayonet slotted guide of the second bayonet joint after the first bayonet projection has been stopped in the first locking position. The second locking position is preferably embodied axially offset from the first locking position such that when the first bayonet projection is moved from the second locking position into the first locking position, there is an increase in the volume of the filter in which medium of the filter may be received.

What is claimed is:
1. A filter comprising:
   a filter bowl;
   a filter element including:
      a filter medium; and
      a first bayonet joint for connecting the filter bowl to the filter element;
wherein the first bayonet joint has a first bayonet projection and a first bayonet slotted guide for guiding the first bayonet projection;
wherein the first bayonet projection may be guided overall in a barb shape successively in the following directions of the first bayonet slotted guide:
   a. in a first insertion direction;
   b. in a first transverse direction that runs transverse to the first insertion direction to a first locking position;
   c. in a second transverse direction that runs transverse to the first insertion direction and transverse to the first transverse direction;
   d. in a third transverse direction that runs transverse to the second transverse direction to a second locking position;
wherein the filter includes a second connecting device that is embodied for connecting the filter element to a filter head of the filter;
wherein the filter head has a medium line that is fluidically connected to the filter element;
wherein the second connecting device is embodied as a second bayonet joint that has a second bayonet projection and a second bayonet slotted guide for guiding the second bayonet projection;
wherein the second bayonet projection is guided overall in a curve successively in the second bayonet slotted guide along directions:
   a. in a second insertion direction;
   b. in a fourth transverse direction that runs transverse to the second insertion direction;
   c. in a fifth transverse direction that runs transverse to the fourth transverse direction to a third locking position;
wherein the fourth transverse direction runs antiparallel to the second transverse direction.

2. The filter in accordance with claim 1, wherein the first insertion direction runs parallel to a filter center longitudinal axis.

3. The filter according to claim 1, wherein the third transverse direction runs antiparallel or parallel to the first transverse direction.

4. The filter according to claim 1, wherein the filter element is embodied in the form of a water-separating filter element;
wherein the filter bowl has a water collection chamber for water separated in the filter element.

5. The filter according to claim 1, wherein
the second connecting device is adjusted to the first bayonet joint such that rotating the first bayonet joint to release the latter also releases the second connecting device.

6. The filter according to claim 1, wherein
the second insertion direction runs parallel to a filter center longitudinal axis.

* * * * *